(12) United States Patent
Tsuji

(10) Patent No.: US 6,253,067 B1
(45) Date of Patent: Jun. 26, 2001

(54) TRANSMITTER/RECEIVER HAVING AN ANTENNA FAILURE DETECTION SYSTEM

(75) Inventor: Kazushi Tsuji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/104,220

(22) Filed: Jun. 25, 1998

(30) Foreign Application Priority Data

Jun. 27, 1997 (JP) .................................................. 9-171940

(51) Int. Cl.$^7$ .................................................. H04B 17/00
(52) U.S. Cl. .......................... 455/115; 455/67.4; 455/562
(58) Field of Search .................................. 455/67.4, 562, 455/115, 97, 226.1, 423, 425; 375/216, 219

(56) References Cited

U.S. PATENT DOCUMENTS

| | | | |
|---|---|---|---|
| 4,324,002 | * | 4/1982 | Spilker, Jr. ............................ 455/27 |
| 5,257,407 | * | 10/1993 | Heinzelmann ...................... 455/67.1 |
| 5,345,601 | * | 9/1994 | Takagi et al. ........................... 455/59 |
| 5,444,862 | * | 8/1995 | Hibino ................................. 455/54.1 |
| 5,471,649 | * | 11/1995 | Rees et al. ........................... 455/67.4 |
| 5,487,176 | * | 1/1996 | Yoneyama ........................... 455/67.1 |
| 5,574,981 | * | 11/1996 | Ahonen ............................... 455/67.4 |
| 5,684,828 | * | 11/1997 | Bolan et al. ........................... 375/238 |
| 6,018,644 | * | 1/2000 | Minarik .................................. 455/82 |

FOREIGN PATENT DOCUMENTS

| | | | |
|---|---|---|---|
| 60-190037 | * | 9/1985 | (JP) .................................. H04B/7/26 |
| 63-38337 | | 2/1988 | (JP) .............................. H04B/17/00 |
| 1-115227 | | 5/1989 | (JP) .................................. H04B/7/15 |
| 2-13021 | | 1/1990 | (JP) .................................. H04B/7/40 |
| 6-276166 | | 9/1994 | (JP) .................................. H04B/1/18 |

* cited by examiner

Primary Examiner—William Cumming
Assistant Examiner—C. Chow
(74) Attorney, Agent, or Firm—McGuireWoods, LLP

(57) ABSTRACT

A transmitter/receiver in a base station comprises an antenna failure detection system including a receiving antenna for receiving a first signal from own station through a transmitting antenna and a second signal from another station, a channel filter for separating the first signal and the second signal, a detector for detecting the second signal, and a comparator for comparing the level of the detected signal, which is proportional to the coupling factor between the transmitting antenna and the receiving antenna, against a threshold to output an antenna failure signal based on the result of the comparison. The antenna failure detection system operates in a normal operation mode of the transmitter/receiver without reducing the number of service channels.

4 Claims, 5 Drawing Sheets

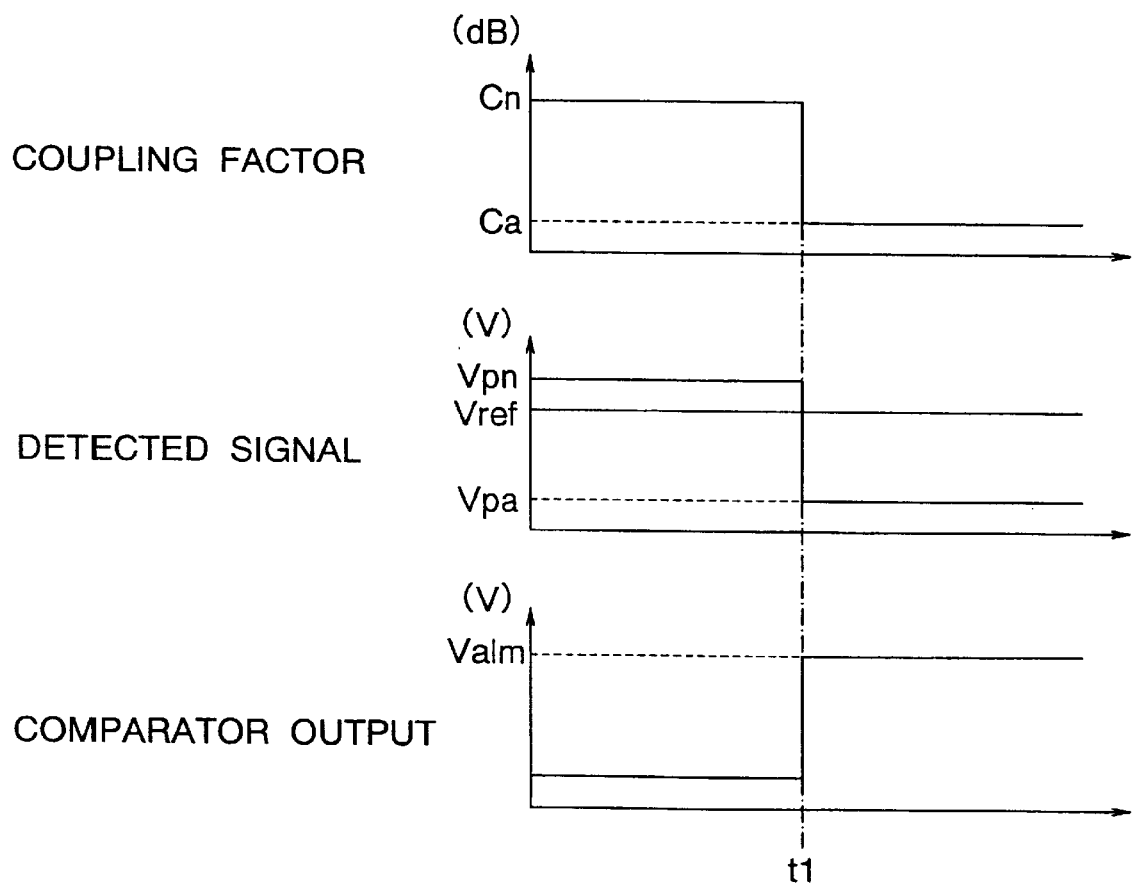

TRANSMITTER/RECEIVER HAVING AN ANTENNA FAILURE DETECTION SYSTEM

BACKGROUND OF THE INVENTION (a) Field of the Invention

The present invention relates to a transmitter/receiver having an antenna failure detection system and, more particularly, to a transmitter/receiver having an antenna failure detection system and preferably used in a base station of a mobile communication system.

(b) Description of the Related Art

An antenna failure detection system is generally used in a transmitter/receiver installed in a base station of a mobile communication system. An example of such an antenna failure detection system is described in JP-A-60-190037.

FIG. 1 shows the transmitter/receiver having an antenna failure detection system described in the publication mentioned above. The transmitter/receiver comprises a transmitting antenna 31 and a pair of receiving antennas 32 and 33, a transmitter 37 for transmitting a down-signal toward a mobile station through the transmitting antenna 31, a receiver 35 for receiving through the receiving antennas 33 and 32 an up-signal from a mobile station during a normal operation mode as well as a test signal during a test operation mode, a mobile test instrument 36 for transmitting/receiving a test signal for detection of an antenna failure, a coupler 34 for coupling transmitted signals from the mobile test instrument 36 with the transmitting/receiving antenna 31 and for coupling transmitted signals from the transmitter 37 with the transmitting antenna 31, a control unit 38 for controlling the operation of the base station, and a test unit 39 for exchanging the base station between the normal operation mode and the test operation mode.

In the test operation, the test unit 39 changes the base station from a normal operation mode to a test operation mode. The mobile test instrument 36 transmits through the antenna 31 a test signal having a format and a frequency used by a mobile station in the normal operation mode. The receiver 35 receives the test signal through the receiving antennas 32 and 33, and the control unit 38 compares the electric field of the received test signal against a reference which is equal to the electric field of the normal signals supplied from the base station without a failure in a normal operation mode, to thereby detect a failure of the base station. The test unit 39 displays an antenna failure based on the result of the comparison.

The transmitter/receiver having the mobile test instrument in addition to the transmitter and receiver, as described above, involves the problem of a large scale circuit for the base station. In addition, the number of service channels is reduced during the test operation mode because the test is conducted by using one of the service channels used in the normal communication.

JP-A-6-276166 describes another conventional antenna failure detection system in the base station, which comprises a pair of antennas 41 and 42 for receiving signals in a diversity receiving scheme, exchangers 43 and 44 disposed for antennas 41 and 42, respectively, for exchanging between transmission and reception, a receiver 46 for receiving transmitted signals through antenna 41 for modulation, a receiver 47 for receiving a transmitted signal through antenna 42 for modulation, a peak detector 48 for detecting a peak electric field of the received signal supplied from the receiver 46 in a unit time length, a peak detector 49 for detecting a peak electric field of the received signal supplied from the receiver 47 in a unit time length, a comparator 50 for comparing both the peak electric fields to output a difference signal representing the difference between the peak electric fields, a failure indicator 51 for indicating occurrence of a failure based on the difference signal, and a transmitter 45 for transmitting data for transmission.

In operation, peak electric fields of the received signals from the receivers 46 and 47 operating in a diversity receiving scheme are detected by the peak detectors 48 and 49, and compared against each other in the comparator 50 in a unit time length. If the difference between the peak electric fields exceeds a threshold value due to a failure of one of the antennas 41 and 42, the comparator 50 identifies a failed antenna having a lower peak electric field. The failure indicator 51 outputs a failed signal based on the difference signal.

The conventional transmitter-receiver of FIG. 2 has a problem in that a real time detection of antenna failure cannot be obtained if the base station has a dedicated receiving antenna and there is no mobile station in the service area of the base station during the test operation. This is because the base station uses a signal supplied from a mobile station which received the test signal in the service area of the base station, and the dedicated receiving antenna cannot be used for detection of reflected power by using the test signal.

In addition, the failure indicator 51 may judge a normal antenna as a failed antenna if the mobile station used for the test is fixed or stopped because the failure is judged based on the difference between both the electric field. In this case, one of the received electric fields may be larger at any time even if both the antennas are normal.

Further, if both the antennas failed at the same time, the failure detection cannot be obtained because the difference of the electric fields is judged based on the premise that the antenna detecting a larger electric field is normal and provides a reference value.

SUMMARY OF THE INVENTION

It is therefore an object of the present invention to provide a transmitter/receiver having an antenna failure detection system which is capable of being formed as a small-scale circuit and detecting the antenna failure in a normal operation mode without reducing the number of service channels.

The present invention provides a transmitter/receiver comprising a transmitter, a transmitting antenna for transmitting a first signal supplied from the transmitter, a receiving antenna for receiving the first signal and a second signal from another station to deliver an antenna signal, a separator for receiving the antenna signal to separate the first signal and the second signal, a receiver for receiving the second signal from the separator, a detector for detecting the first signal to output a detected signal which is proportional to a coupling factor between the transmitting antenna and the receiving antenna, and a comparator for comparing the detected signal against a reference to output an antenna failed signal based on the result of the comparison.

In accordance with the transmitter/receiver of the present invention, an antenna failure can be detected from the first signal transmitted from the transmitter to another station, such as mobile station, in a normal operation mode, without reduction of the service channels of the transmitter/receiver.

The above and other objects, features and advantages of the present invention will be more apparent from the following description, referring to the accompanying drawings.

BRIEF DESCRIPTION OF THE DRAWINGS

FIG. 5 is a timing chart for showing an occurrence of an antenna failure.

PREFERRED EMBODIMENTS OF THE INVENTION

Figure 1:
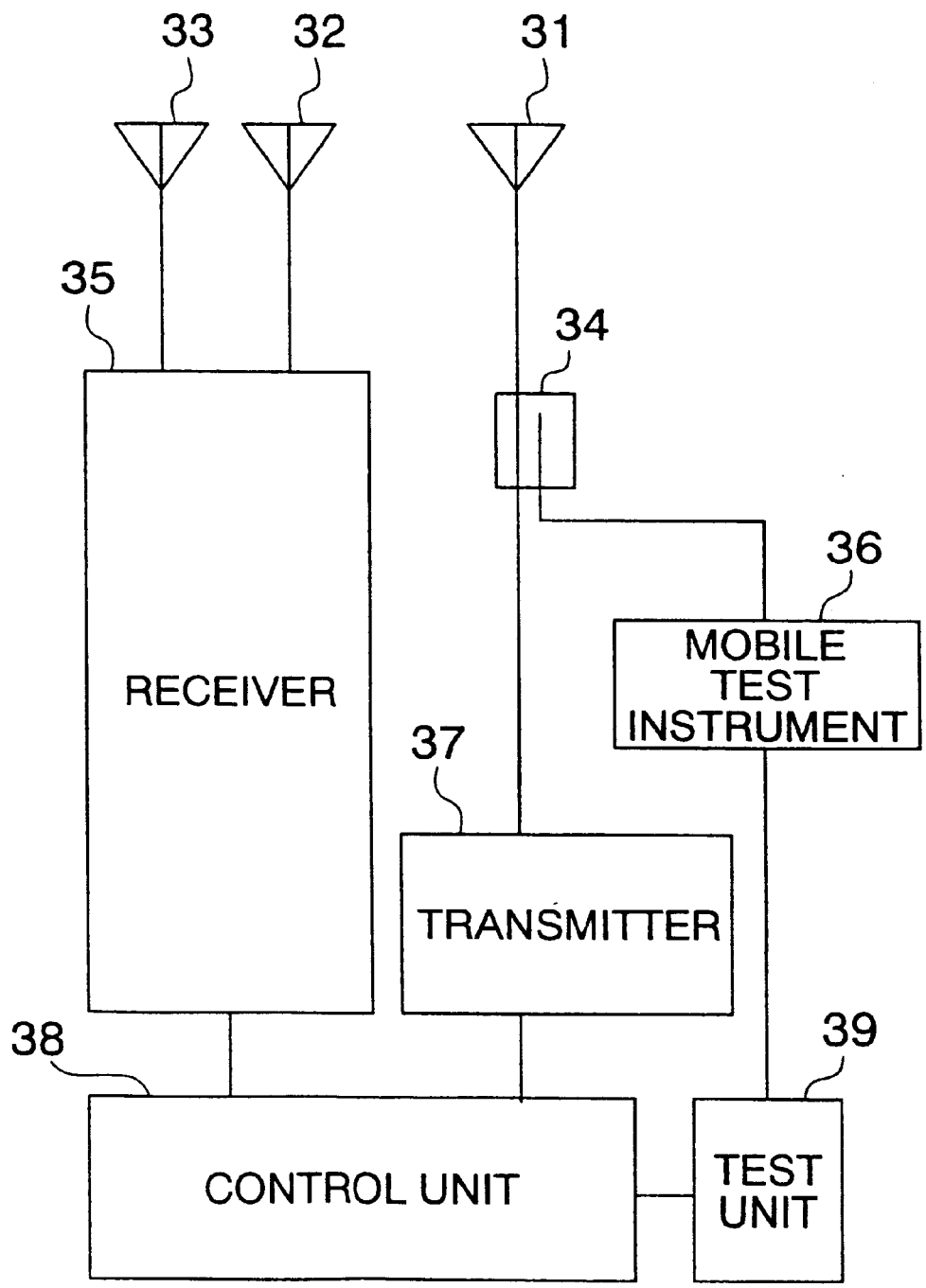
FIG. 1 is a block diagram of a conventional transmitter/receiver.
Figure 2:
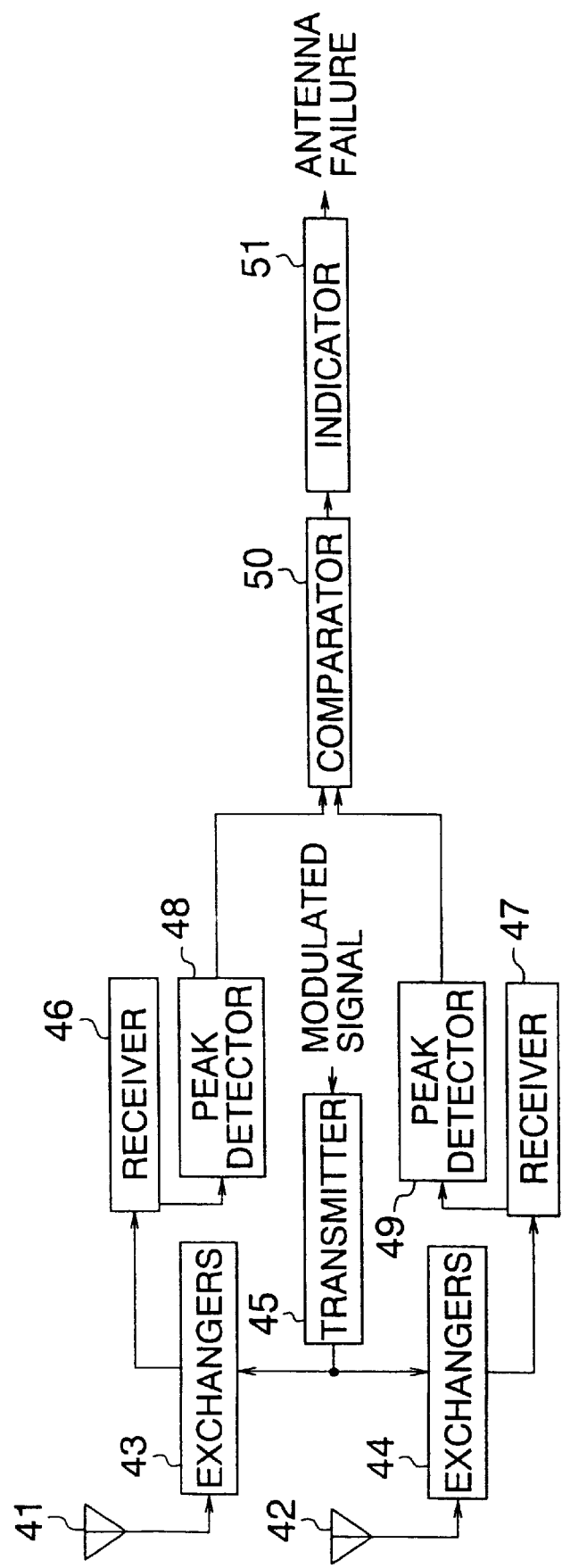
FIG. 2 is a block diagram of another conventional transmitter/receiver.

Now, the present invention is more specifically described with reference to accompanying drawings, wherein similar constituent elements are designed by the same or similar reference numerals.

Figure 3:
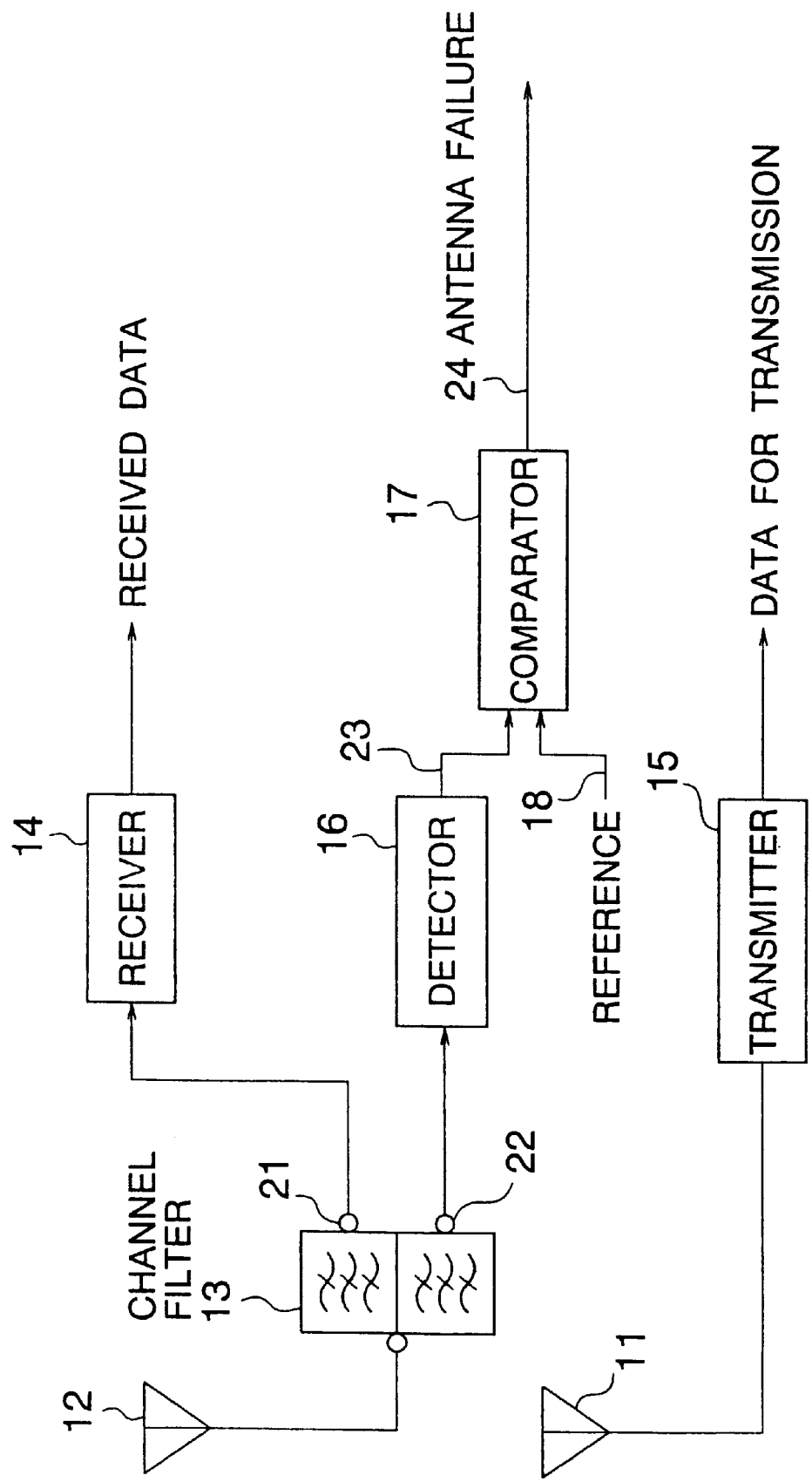
FIG. 3 is a block diagram of a transmitter/receiver according to a first embodiment of the present invention.

Referring to FIG. 3, a transmitter/receiver according to a first embodiment of the present invention is exemplarily implemented as a frequency domain duplex (FDD) system. The transmitter/receiver of the present embodiment comprises a transmitting antenna 11, a receiving antenna 12, a channel filter 13, a receiver 14, a transmitter 15, a detector (demodulator) 16, and a comparator 17.

The transmitter 15 converts data for transmission into a transmission signal and supplies the same through the transmitting antenna 11, which radiates the transmission signal in the air. The receiving antenna 12 catches the signals transmitted from the own station and from any mobile station staying in the service area of the base station. The channel filter 13 receives transmitted signals from the own station and mobile station, to deliver the signal supplied from the mobile station to the receiver 14 through the first output 21 thereof and the signal supplied from the own station to the detector 16 through the second output 22 thereof.

In the FDD system, a sufficient difference is generally assured between the frequency assigned to the up-channel and the frequency assigned to the down-channel. The co-existence of the up-channel and the down-channel in the received signals allows the channel filter 13 to be implemented by a pair of band-pass filters, as shown in the figure, one of which passes transmitting band of the mobile station and the other of which passes the transmitting band of the own station. In addition, since the channel filter 13 can be installed as a substitute for a band-limiting filter generally used in an ordinary receiver, the insertion of the channel filter 13 according to the principle of the present invention does not degrade the received signal.

The output 22 of the channel filter 13 for the detector 16 includes noise signals such as down-signals from adjacent base stations, the noise signals being in the same band as the transmitted signals from the own station. However, since the receiving antenna 12 is fixed adjacent to the transmitting antenna 11, the level of the signal transmitted from the own station and received by the receiving antenna 12 is considerably higher than the level of the noise signals so that an accurate separation is not needed for separating the received transmitted signal of the own station from the noise signals in the transmission band. Accordingly, a simple detector, such as a single-diode detector, can be used as the detector 16. The detector 16 receives the output 22 from the channel filter 13 to deliver a detected signal 23, which is proportional to the coupling factor between the transmitting antenna 11 and the receiving antenna 12.

If the level of the transmitted signal from the own station is small, or if the coupling factor between the transmitting antenna 11 and the received antenna 12 is too low to obtain a sufficient level of the detected signal 23, a suitable radio-frequency (RF) amplifier may be provided between the channel filter 13 and the detector 16. The comparator 17 receives the detected signal 23 and compares the same against a reference voltage 18, which is fixed in this embodiment. An antenna failed signal 24 is output from the comparator 17 if the detected signal 23 exceeds the reference voltage or threshold 18.

The comparator 17 has a hysteresis with respect to the reference voltage 18, which prevents an error signal of the antenna failure from occurring. The error signal may be generated in the conventional technique due to small fluctuations of the detected signal 23 in the case of presence of an amplitude modulation component in the transmitted signal.

The detector 16 may be replaced by another receiver for receiving the transmitted signal from the own station, wherein the detected signal is replaced by the electric field of the received signal supplied from the another receiver. If a space diversity receiving scheme is employed in the present embodiment by using a frequency antenna (shared antenna) acting as both the transmitting antenna 11 and a receiving antenna other than the receiving antenna 12, the failure detection can be also effective by inserting an antenna sharer between the frequency antenna 11 and the receiver 15.

Figure 4A:
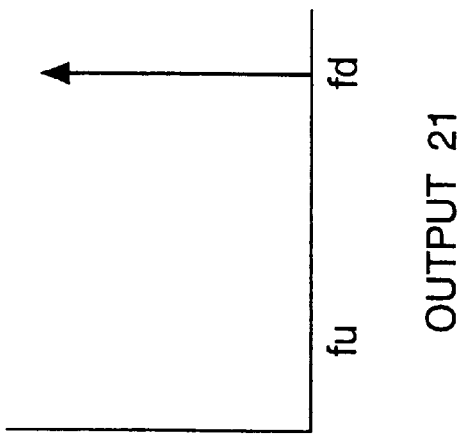
FIGS. 4A, 4B and 4C are spectral diagrams of respective signal in transmitter/receiver of FIG. 3.
Figure 4B:
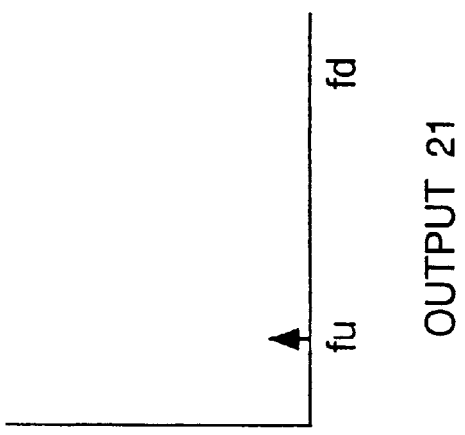
Figure 4C:
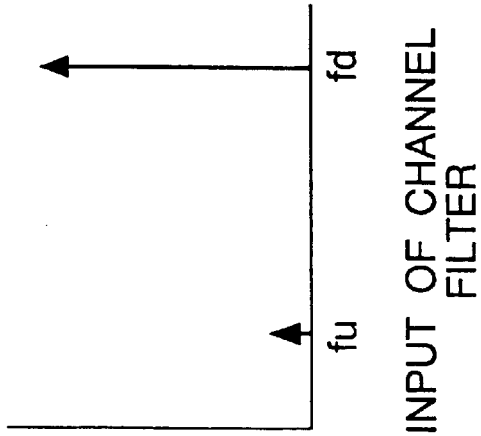

FIGS. 4A to 4C are spectral diagrams of the signal received by the receiving antenna (input of the channel filter 13), the first output 21 of the channel filter 13 and the second output 22 of the channel filter 13 in the transmitter/receiver of FIG. 3, wherein "fu" represents frequency (MHz) of the received signal from the mobile station and "fd" represents frequency (MHz) of the received signal from the own station. In operation, the channel filter 13 receives through the receiving antenna 12 signals from both the mobile station and the own station, as shown in FIG. 4A. The channel filter 13 separates the received signal 21 from the mobile station, such as shown in FIG. 4B, which is supplied to the receiver 14, and the received signal 22 from the own station, such as shown in FIG. 4C, which is supplied to the detector 12. The signal 22 from the own station is detected from the envelope thereof in the detector 12 and delivered as a detected signal 23 which is proportional to the coupling factor between the transmitting antenna 11 and the receiving antenna 12.

FIGS. 5 shows timing charts showing the case of antenna failure, wherein one of the antennas 11 and 12 fails at time t1. In the figure, Cn and Ca represent a normal coupling factor and a failed coupling factor, respectively, in terms of decibel, Vpn, Vpa and Vref represent a normal detected signal voltage, a detected signal voltage from the failed antenna and the reference voltage for the comparator 17, respectively, and Valm 24 is a failed output from the comparator 17.

In the present embodiment, it is noted that if one of the antennas 11 and 12 fails, the coupling factor between the antennas 11 and 12 falls. Thus, the reduction of the coupling factor is detected in the present embodiment for detecting an occurrence of an antenna failure. When both the antennas 11 and 12 are normal, the coupling factor is at a constant Cn before t1, as a result of which the detected signal 23 is at Vpn and the comparator output 24 is low. When one of the antennas 11 and 12 fails at t1, the coupling factor reduces from Cn to Ca, as a result of which the detected signal 23 fills from Vpn to Vpa below reference Vref and the comparator output 24 rises to Valm, thereby showing an occurrence of failed antenna.

If the present embodiment is to be applied to another transmitter/receiver wherein transmitting power is controlled based on a transmitting power control signal, the reference voltage Vref should be also controlled based on the transmitting power control signal to effectively detect the suitable level of the transmitted signal.

The present embodiment provides the advantages in that the antenna failure detection system can be implemented by a small-scale circuit and therefore can be installed in a small-scale transmitter/receiver, that the detecting operation of the antenna failure does not reduce the number of service channels, the detection of the antenna failure can be conducted at real time without a mobile station staying in the service area of the base station, that a normal antenna is not detected to have a failure in error, as encountered in the conventional technique, and that the detection system can also detect a failure of both the antennas.

Since the above embodiments are described only for examples, the present invention is not limited to the above embodiments and various modifications or alterations can be easily made therefrom by those skilled in the art without departing from the scope of the present invention.

What is claimed is:

1. A transmitter/receiver comprising a transmitter, a transmitting antenna for transmitting a first signal supplied from said transmitter, a receiving antenna for receiving said first signal and a second signal from a station to deliver an antenna signal, a separator for receiving said antenna signal to separate said first signal and second signal, a receiver for receiving said second signal from said separator, a detector for detecting said first signal to output a detected signal which is proportional to a coupling factor between said transmitting antenna and said receiving antenna, and a comparator for comparing said detected signal against a reference to output an antenna failed signal based an the result of the comparison.

2. A transmitter/receiver as defined in claim 1, wherein said separator comprises a pair of band-pass filters including a first filer passing a band of said fast signal and a second filter passing a band of said second signal.

3. A transmitter/receiver as defined in claim 1 further comprising a radio-frequency amplifier connected between said separator and said detector.

4. A transmitter/receiver as defined in claim 1 further comprising an antenna sharer between said transmitting antenna and said transmitter, wherein said transmitting antenna is implemented as a frequency antenna shared with another receiving antenna.

* * * * *